(No Model.) 2 Sheets—Sheet 2.

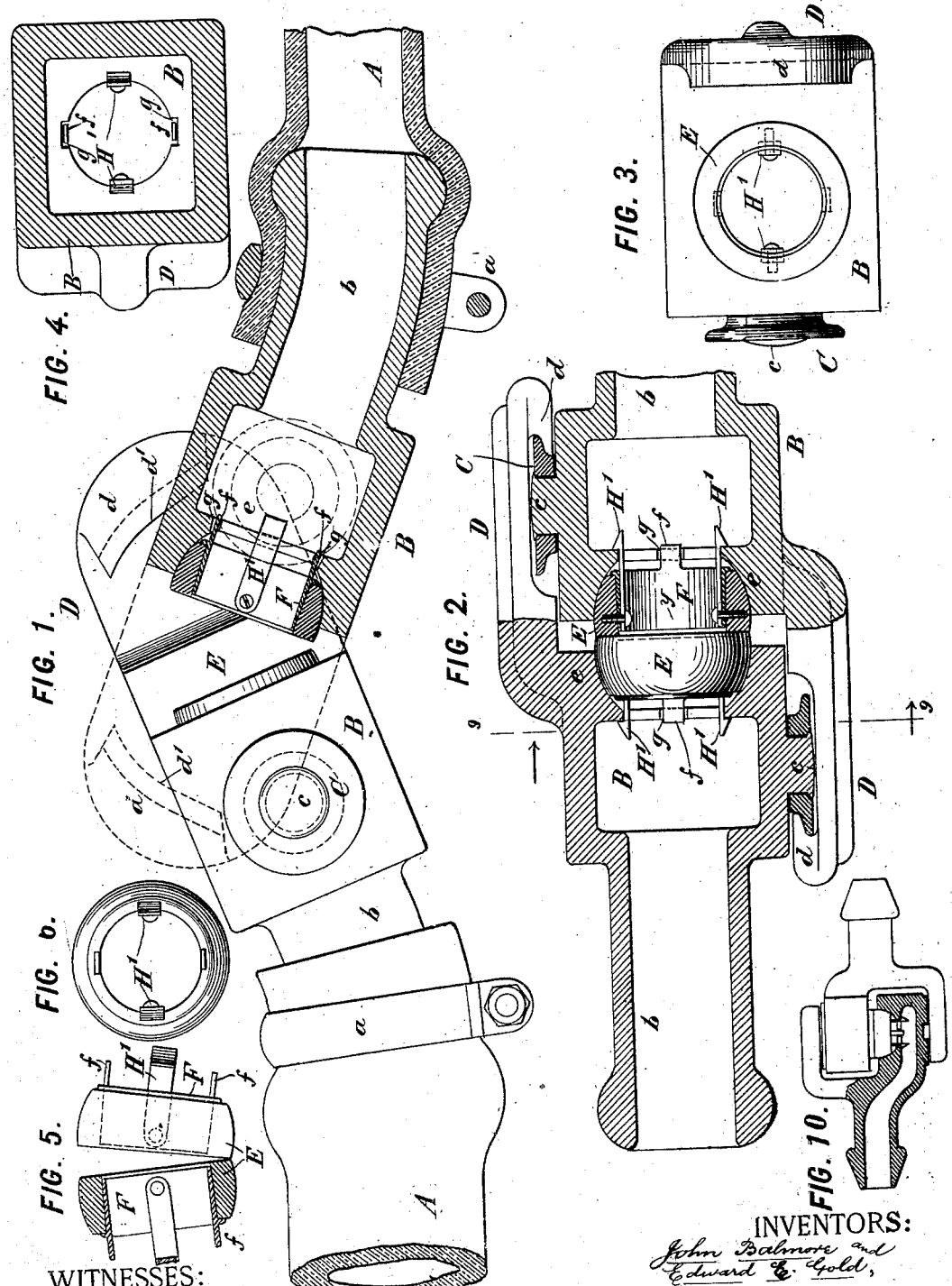

J. BALMORE & E. E. GOLD.
HOSE COUPLING.

No. 475,738. Patented May 24, 1892.

WITNESSES:
John Beerter
Fred White

INVENTORS:
John Balmore and
Edward E. Gold,
By their Attorneys,
Arthur C. Fraser & Co.

UNITED STATES PATENT OFFICE.

JOHN BALMORE AND EDWARD E. GOLD, OF NEW YORK, N. Y.; SAID BALMORE ASSIGNOR TO SAID GOLD.

HOSE-COUPLING.

SPECIFICATION forming part of Letters Patent No. 475,738, dated May 24, 1892.

Application filed July 23, 1891. Serial No. 400,384. (No model.)

*To all whom it may concern:*

Be it known that we, JOHN BALMORE and EDWARD E. GOLD, both citizens of the United States, residing in the city, county, and State of New York, have invented certain new and useful Improvements in Hose-Couplings, of which the following is a specification.

This invention relates to couplings for hose or flexible pipe of the class known as "direct-port couplings," or those having axial seats the meeting faces of which occupy a plane perpendicular to the general direction of the pipe. Although designed especially for coupling the terminal hose-lengths connecting with the steam-heating and air-brake pipes of railway-cars, our improved coupling is nevertheless adapted to other purposes where sections of hose or flexible or jointed pipes are to be connected together.

Our invention relates to the construction of the seat and its mounting relatively to the coupling-head and to the fastening devices for locking the two heads together.

Figure 8:
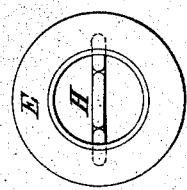
Figure 7:
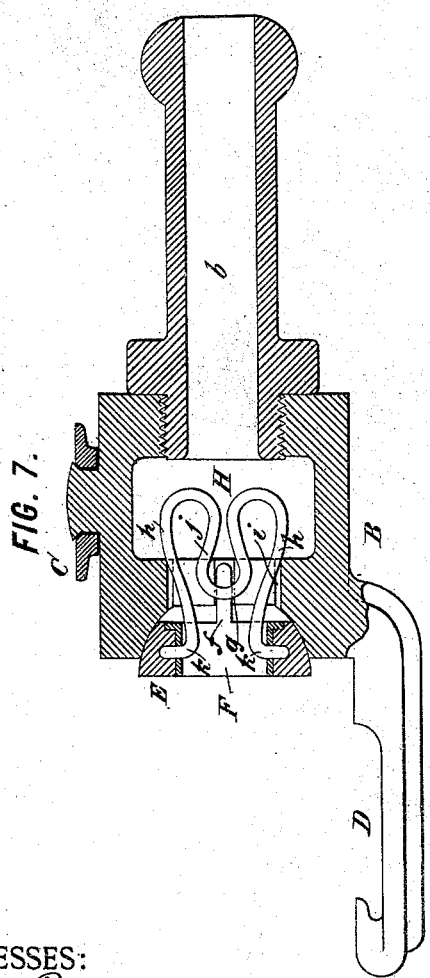
Figure 9:
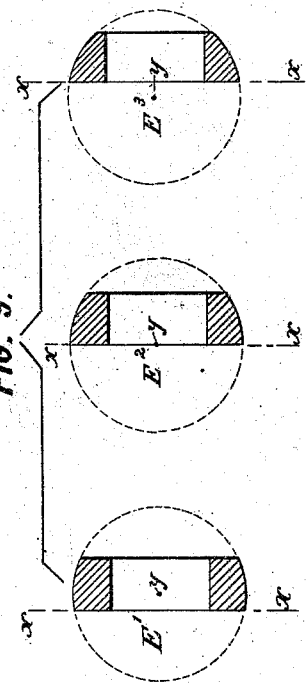

Figure 1 of the accompanying drawings is a side elevation of a coupler constructed according to our invention, the right-hand head being shown in vertical mid-section and the two heads being shown in the act of coupling. Fig. 2 is a horizontal section through the coupling-heads, showing them coupled together. Fig. 3 is an end elevation of one of the heads. Fig. 4 is a cross-section on the line 9 9 in Fig. 2 and looking toward the seat. Fig. 5 shows the two seats removed, one being shown in mid-section and the other in elevation. Fig. 6 is a rear elevation of one of the seats removed. Fig. 7 is a horizontal section of one of the coupling-heads, showing the preferred construction for holding the seat in place. Fig. 8 is a front elevation of the seat removed. Fig. 9 includes three diagrams of different constructions of seats. Fig. 10 is a sectional elevation of a modification.

Let A A designate the lengths of hose that are to be coupled together, and B B the respective coupling-heads, which are attached thereto in any suitable way. In the construction shown the heads are formed each with a tubular shank $b$, over which the end of the hose is drawn and fastened by a clamp $a$; but other constructions known in the art may be provided instead. The heads are provided with some suitable means for fastening them firmly together. To this end they are provided with any suitable reciprocal locking or fastening provisions. In the construction shown in Figs. 1, 2, and 3 these fastening provisions consist of a locking projection C, formed on one side of the head and a locking-arm D on the other side of the head, projecting forward beyond the end of the body of the head and formed at its outer portion with a projection or hook $d$, adapted to engage the projection C on the side of a reciprocal coupling-head during the act of coupling. By bringing the heads together in the position shown in Fig. 1, so that their respective locking projections engage one another, and then tilting the heads downward, the locking projections $b$ $b$ ride over the projections C C, and by being made slightly inclined they exert a thrust each against the opposite head, acting to force or wedge the two heads tightly together, and thereby to press their respective seating faces into such intimate contact as to resist an internal fluid-pressure and prevent leakage.

Each coupling-head is provided with a seat E, projecting slightly from its body portion, as shown best at the left in Fig. 1. When the two heads are coupled together, the flat faces of their seats are pressed together face to face. In couplings of this character as heretofore constructed the seats have been rigidly attached to the head and have commonly been made of a somewhat yielding composition in order that in case of wear or in case the heads do not couple accurately those portions of the seating-faces which most closely approach each other, and which consequently come into contact first, shall yield sufficiently to admit the remaining portions of the seating-faces to come into contact. Notwithstanding the use of such yielding seats, couplings of this character as heretofore made have been subject to the disadvantage of a considerable liability to leakage, which has been due in large part to the wear of the seating-faces at the lower sides, where they first come into contact in the act of coupling. Such leakage is also due to abrasion or mechanical injury of the seats or to the imperfect fitting together of the locking-faces of the coupling-heads, which, although made interchangeable, will sometimes wear unequally. To overcome these disadvantages is the principal object of our present invention. To this end we construct and mount the seat in such manner that it may rock or tilt relatively to the coupling-head, so that it may adjust itself to perfect coincidence with the face of the opposite seat. This tilting or rocking movement might be permitted to occur in one direction only—as about a horizontal axis, for example; but preferably the seat is so mounted as to be capable of a universal motion. To give it such a universal motion, we form the seat externally as the segment of a sphere, and mount it in a socket in the coupling-head, which has likewise the form of a segment of a hollow sphere. The seat may be made of any suitable material, either rigid or suitably yielding, and it may be attached to the head in any suitable manner to prevent its displacement, while yet admitting of the requisite freedom of motion.

In the construction shown in Figs. 1 and 2 the seat E is made of a ring of suitable packing material, preferably what is known as "asbestus composition," which is sufficiently hard and presents a smooth and frictionless surface. The spherical exterior surface of the seat comes into direct contact with the hemispherical socket e in the end of the head. In the act of coupling as the two seats come into contact their flat outer faces meet together, and if either projects more at one side than another one or both of the seats will execute a rocking movement in its socket sufficiently to compensate for the inequality and bring both the seats into uniform contact over their entire seating-faces, thereby, as the heads are forced tightly together in the final movement of the coupling action, making a uniformly-close joint around the entire circumference of the seating-faces.

In the case of a composition or yielding seat the pressure by which the seat is driven back and forced into its socket tends to contract the opening through the seat, so that in course of time the opening would considerably diminish in size. To prevent this, we insert within the seat a tubular thimble F, of metal or other rigid material. It is desirable to guide the seat in such manner as to limit its rocking movement and to prevent its rotating in its socket. To this end we form the thimble F with two opposite guiding-fingers $f$ $f$, which project inwardly and enter notches $g$ at the base of the socket. These notches have abrupt sides, which loosely engage the edges of the fingers and prevent their circumferential or rotative movement, while the outer sides of the notches, which preferably are cut obliquely, as shown in Fig. 1, serve to limit the angular movement of the fingers, and consequently the extent of the rocking or tilting movement of the seat. The greatest rocking or tilting movement will be in vertical direction, since the coupling-heads are locked together by a vertical tilting movement, so that the rocking of the seats must compensate for the wear during this movement, as well as for the different extent to which different pairs of heads will engage in coupling, depending upon the different shape or different extent of wear of their locking-faces. The rocking movement in lateral direction will be much less, and in fact is scarcely appreciable.

Numerous different fastening devices may be devised for holding in the seat. The construction for this purpose that we prefer is the one shown in Figs. 7 and 8 of the drawings. The seat is loosely pivoted on a horizontal axis to the opposite end of a spring-fastener H, which occupies a horizontal plane and extends from the seat inwardly through the opening in the head, its sides flaring outwardly sufficiently at the points marked $h\ h$ to afford a strong frictional engagement with notches $i\ i$, formed in the opening in the head. The spring-fastener H is preferably made of wire bent to form the outward loops $h\ h$ and between them an inward loop or eye $j$ and with the ends $k$ of the wire turned outwardly and adapted to snap into pivotal holes in opposite sides of the opening through the seat. The outward tension of the spring keeps the pivotal ends $k$ pressed firmly into the pivotal holes and keeps the loops $h\ h$ in firm frictional contact with the notches $i\ i$, so that a strong outward pull would be necessary to disengage the seat from the head. The loop $j$ affords a convenient eye by means of which to take out the seat when this becomes necessary. To remove the seat, a hook may be inserted into the eye $j$, so that by pulling outwardly it draws the eye forward, and consequently pulls the loops $h\ h$ inward enough to facilitate their disengagement from the notches $i\ i$, whereupon the spring-fastener and seat come off together. The interior of the head is thus rendered accessible. To reinsert the seat or to insert a new one, the fastener H is first brought horizontally into the head, with its loops in coincidence with the notches $i\ i$, through which they pass and beyond which they extend sufficiently, so that when the seat reaches its proper position in the socket the engagement of the fastener suffices to hold it there.

With the constructions heretofore in use the substitution of a new seat for a worn or damaged one is a work of considerable difficulty, involving the unscrewing of bolts and the taking apart of the coupling-head. With our improved construction, however, the removal of a seat is performed with the utmost ease and facility, involving no more trouble than the insertion of a hook or pliers and the withdrawal of the seat by a single pull or jerk, while the insertion of a new seat is equally convenient, requiring only that it be pushed into place. The train-hands may carry one or two extra seats in their pockets ready to be substituted for any seat that may be found to leak. The fasteners H may be already applied to the seats or they may be easily sprung into place by the trainmen.

The fastening device shown in Figs. 1 to 6 differs slightly from that already described. It consists of two hooks H' H', pivoted to the thimble F on diametrically-opposite sides, extending thence inward and formed with prongs or hooks which engage the throat of the socket for the seat. To enter the seat, it is only necessary to push it into the socket, whereupon the hooks will engage and hold it. To remove the seat, a special tool is necessary, which may be inserted through the throat of the head to engage the hooked ends and draw them inward sufficiently to release them. This construction is well adapted for the purpose, but is more complicated than that first described and less convenient to operate, since it requires a special tool, and for these reasons the spring-fastener H, first described, is preferred.

Fig. 9 includes three diagrams, showing three different ways of forming the seat. In each case the seat is a segment of a sphere. In the diagram E' the seating-face $x\ x$ is formed in a plane outside of or beyond the center $y$ of the sphere. This is the construction shown in Figs. 1 to 6, where the axis of the pivotal screws by which the seats are jointed to the hooks H' intersects the center $y$, so that the seats in their rocking movement rock on these pivots without displacing the pivots. In the diagram $E^2$ the seating-face $x\ x$ is in a plane intersecting the center $y$, so that when two seats thus proportioned come into contact they both become segments of one sphere. This is the construction shown in Fig. 7. During the rocking movement of the seats the axis of the pivots $k\ k$ is displaced by reason of being out of coincidence with the center $y$. This displacement is allowed for by the construction of the fastener H, which is free to vibrate around an axis extending between the points of contact of its loops $h$ with the notches $i$. The diagram $E^3$ shows the seating-face $x\ x$ arranged inside of the center $y$ of the sphere a proportion which reduces the friction between the exterior of the seat and its socket, but which increases the displacement of the pivots $k\ k$ during the rocking of the seat. Either of the three constructions shown in Fig. 9 is admissible with our invention.

Our improved self-compensating seats for couplings are not limited in their application to couplings of the class already described, but are applicable to any kind of pipe-couplings where seats on two reciprocal coupling-heads or sections are forced together by the locking or coupling of the sections. As an example of one such modification we have shown in Fig. 10 the application of our invention to a pipe-coupling with lateral ports, being the well-known "Gold" coupling. This coupling is so well known in the art as to require no description. The only respect in which it is altered to apply our present invention to it is to form the coupling head or bowl with a spherical socket to receive the seat E.

Our invention introduces a feature of improvement in the class of couplings known as "direct-port couplings" and the heads of which have a locking projection on one side and a locking-arm projecting from the other side. As heretofore constructed, the locking projection on the side of such a coupling-head has been made as a solid piece, with a wedging or eccentric locking-face on its rear side to be engaged by a similar locking-face carried by the locking-arm of the opposite coupling-head. With this construction there is an undue amount of friction in the act of locking the two heads together, this disadvantage being especially objectionable while automatically uncoupling by the pulling apart of the cars, since there is liability that the respective locking-faces being in direct contact will fail to slip past each other by reason of the tilting movement of the head as the hose-sections are pulled taut, which would cause the tearing or pulling off of one or both sections of hose. The wear is also objectionable, since it causes the coupling-heads in coupling to move in angular direction to a greater extent than they are designed to move. To overcome these difficulties, we construct the locking projection C, not as a solid lug, but as a pivoted roller, as clearly shown in Figs. 1, 2, and 3. This roller should be made of hardened steel or other suitable material and is formed on its outer side with a flange of sufficient depth to engage the locking projection $d$, carried by the arm D of the opposite head. The roller C may be pivoted in various ways, that preferred being by forming on the side of the head a spindle or stud $c$ which is turned down true and the roller placed over it, after which the stud is headed or riveted down to form a flange at its end, which enters a suitable countersink formed in the outer face of the roller. In the act of coupling this roller will turn on its stud, so that its contact with the locking-face $d$ becomes a rolling contact, whereby wear is greatly reduced and the friction in coupling and uncoupling is decreased. When fully coupled, the frictional or wedging engagement is amply sufficient to hold the heads firmly coupled together, since the locking projections $d$ bear upon the rollers C at the points lettered $d'$ in Fig. 1, where the locking-faces are almost perpendicular to the longitudinal axes of the heads, so that the strain of the steam-pressure has no tendency to uncouple the head, while the weight of the coupling tends constantly to keep it coupled. Beyond the point $d'$ the face $d$ curves backward sharply toward its seat, in order to provide for taking up any unusual wear in the couplings without necessitating a much greater tilting movement thereof.

We claim as our invention the following-defined novel features or combinations, substantially as hereinafter specified, namely:

1. In a pipe-coupling, the combination of a coupling head or section having a hemispherical socket, a seat consisting of a segment of a sphere fitting in said socket, and a fastening engaging the seat and head to hold the seat in place in said socket and pivotally connected to the seat to permit of a rocking movement of the latter.

2. In a pipe-coupling, the combination of a coupling head or section having a semi-spherical socket, a seat consisting of a segment of a sphere fitting in said socket, and a spring fastening engaging said seat, formed to make elastic engagement with the interior of said head, whereby to hold the seat in place in said socket and adapted to yield sufficiently to enable it to be withdrawn to remove the seat.

3. In a pipe-coupling, the combination of a coupling-head B, having socket e and grooves i i, rocking seat E and fastener H, consisting of pivotal ends engaging said seat, and outwardly-springing portions h h, engaging said grooves.

4. In a pipe-coupling, the combination of a coupling-head B, having socket e, rocking seat E and fastener H, consisting of pivotal ends engaging said seat, outward loops h h, engaging the interior of the head, and intervening loop j for facilitating the pulling out of the fastener.

5. In a pipe-coupling, the combination of a coupling head or section having a semi-spherical socket and stops g g, with a seat consisting of a segment of a sphere fitting in said socket, and stop projections f f, engaging said stops to limit the movement of the seat.

6. In a pipe-coupling, the combination of a coupling head or section having a hemispherical socket, and notches g g back of said socket, with a seat consisting of a segment of a sphere fitting in said socket and having projections f f, entering said notches, whereby the rotative displacement of the seat is prevented.

7. In a pipe-coupling, the combination of a coupling-head having a direct longitudinal passage through it terminating in a seat at its end, a locking-arm on one side projecting beyond the plane of the seat, and a locking projection on the other side, said locking-arm having a wedging-face d, formed in an eccentric curve extending to the middle line of the coupler at d' and continued beyond said line in a curve of smaller radius to form an inclined stop for limiting the extent of angular engagement of the respective coupling-heads.

8. In a pipe-coupling, the coupling-head having a hemispherical socket, in combination with a self-adjusting seat, consisting of a ring of yielding material formed externally as a segment of a sphere, having a central opening, a longitudinal passage therethrough and a flat outer seating-face around said central opening, and a thimble or sleeve of rigid material within said ring, lining said longitudinal passage and preventing the inward expansion of said ring by pressure applied to said seating-face, substantially as set forth.

9. A seat for a pipe-coupling, consisting of a ring of yielding material formed externally as a segment of a sphere, having a central opening, a longitudinal passage therethrough, a flat seating-face around said central opening, and a thimble or sleeve of rigid material within said ring, lining said longitudinal passage and preventing the inward expansion of said ring, substantially as set forth.

In witness whereof we have hereunto signed our names in the presence of two subscribing witnesses.

JOHN BALMORE.
EDWARD E. GOLD.

Witnesses:
GEORGE H. FRASER,
CHARLES K. FRASER.